May 13, 1952  L. M. GRIMES  2,596,546
METHOD FOR MAKING EMBOSSED PRESSURE-SENSITIVE TAPE
Filed Aug. 31, 1948

Inventor:
Louis M. Grimes
By Lee J. Gary
Attorney

Patented May 13, 1952

2,596,546

UNITED STATES PATENT OFFICE 2,596,546

METHOD FOR MAKING EMBOSSED PRESSURE-SENSITIVE TAPE

Louis M. Grimes, Chicago, Ill.

Application August 31, 1948, Serial No. 47,072

3 Claims. (Cl. 117—122)

This invention relates to embossed pressure-sensitive tape and is more particularly concerned with friction tapes of the type commonly sold in rolls and employed as insulation for electrical conductors.

Friction tapes have heretofore been formed of strip materials, such as rubber, woven fabric, etc., coated on one face with a suitable adhesive, and with a layer of "holland" cloth applied over the adhesive to serve as a separator layer. When employed with rubber type friction tape, the "holland" cloth is provided with a smooth, waxy surface and does not adhere to the pressure sensitive adhesive.

It is an object of the present invention to provide a pressure-sensitive tape embodying a synthetic elastomeric strip material in place of the rubber or woven fabric strips heretofore employed, as such material does not deteriorate with age and, in addition, has sufficient elasticity to enable it to tightly hug the conductors and to yield with the wire so that the flexibility is not impaired.

It is a further object of this invention to provide a pressure-sensitive tape which does not require the use of "holland" cloth, or other material, as a separator layer between adjacent convolutions of a roll.

This invention further contemplates the provision of an improved method and apparatus for applying the pressure-sensitive adhesive to the strip of synthetic elastomeric material. As synthetic elastomeric materials, such as the vinyls and polyethylenes, are not softened by solvents normally used in adhesives, it has heretofore been difficult to coat the non-porous surfaces of the strips with a pressure-sensitive adhesive, as the plasticizer tends to migrate to the surface of the adhesive during ageing and to lift the adhesive from the surface of the strip.

The present invention contemplates the provision of an embossed surface on one face of the synthetic elastomeric strip to receive and provide proper anchorage for the adhesive, the other side of the strip being smooth and free of any embossing which might tend to cause adhesion of adjacent convolutions after the pressure-sensitive tape is formed into rolls.

It is a further object of this invention to provide a pressure-sensitive tape embodying dielectric qualities which do not create a periodicity effect in high frequency applications where the tape replaces the actual dielectric of cables spliced in the field in high frequency installations. It has been found that ordinary friction tapes, when used in high frequency circuits, create a discontinuity in the dielectric and consequently change the attenuation of the basic cable.

This invention embodies other novel features, details of construction, and methods and apparatus of manufacture which are hereinafter set forth in the specification and claims and illustrated in the accompanying drawing, wherein:

Figure 1:
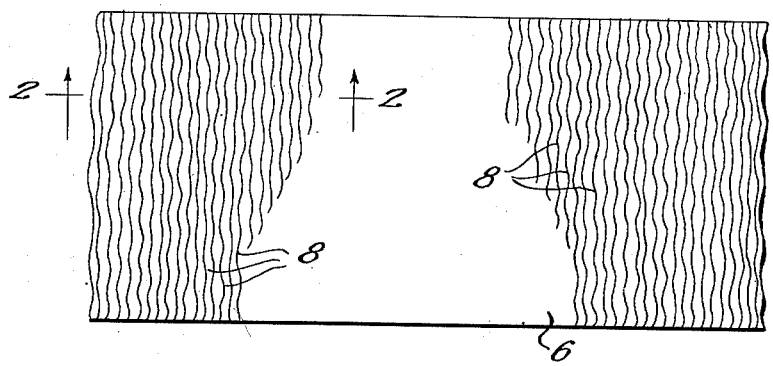
Fig. 1 is a plan view showing the method in which one surface of a strip is embossed prior to the application of a pressure-sensitive adhesive thereon.

Referring now to the drawings for a better understanding of this invention, the embossed pressure-sensitive tape is shown as comprising a strip 6 of synthetic elastomeric material, such as, for example, a vinyl or polyethylene, which does not deteriorate with age and embodies sufficient elasticity to tightly hug electrical conductors and remaining insulation thereon, and which will yield with the conductors so that flexibility is not impaired.

Since synthetic elastomeric materials, such as vinyls and polyethylenes, have smooth, non-porous surfaces and are not softened by solvents normally used in adhesives, the present invention contemplates embossing one surface of the strip to receive and insure a proper anchorage for an adhesive 7 applied thereto. It has been found that the embossing of the strip is essential in bonding pressure-sensitive adhesive to the strip as oil-type plasticizers, incorporated in the adhesive compound to render the adhesive flexible, have a tendency to migrate to the surface of the adhesive and thus make it more difficult to bond the adhesive to the surface of the strip. Even though an adhesive embodying an oil-type plasticizer is successfully applied to a strip of synthetic elastomeric material during manufacture, the plasticizer may migrate to the surface of the adhesive during ageing or usage and thus result in a tendency of the adhesive to relieve itself from the strip.

Figure 2:
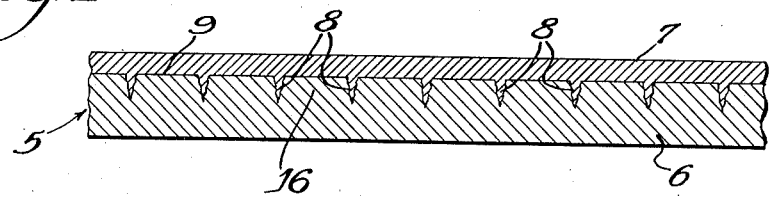
Fig. 2 is an enlarged sectional view taken along the line 2—2 of Fig. 1, showing a coating of pressure-sensitive adhesive as applied to the embossed side of the strip.
Figure 3:
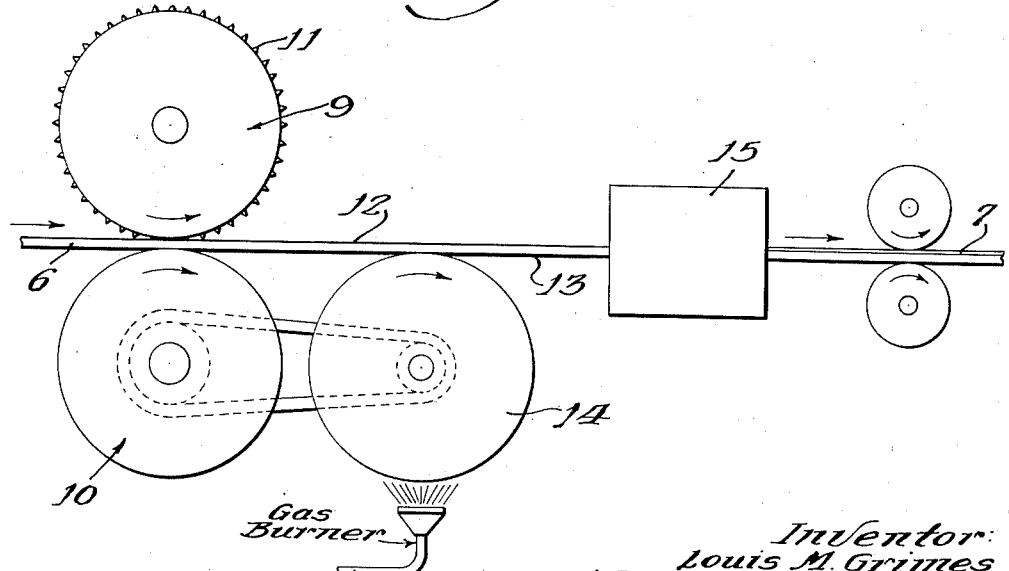
Fig. 3 is a diagrammatic view illustrating the apparatus employed for embossing a strip and applying pressure-sensitive adhesive to the embossed surface of the strip.

To insure a proper anchorage for the pressure-sensitive adhesive 7 to the surface of a strip 6 of a synthetic elastomeric material, one surface of the strip 6 is preferably embossed with a series of transversely-extending, irregular depressions 8 which are smaller in surface area than the plateau areas 9 between the depressions. As illustrated in Fig. 2 of the drawings, the adhesive flows into the depressions 8 to provide footings or points of anchorage at spaced intervals for the adhesive coating. It has been learned that a series of irregular depressions provide a better anchorage for the adhesive than straight-line embossing, extending transversely and/or longitudinally of the strip. The type of pressure-sensitive adhesive 7 forms no part of the present invention, but is preferably a compound embodying a rubber, synthetic rubber or resin base, the adhesive coating 7 being applied to the strip of synthetic elastomeric material by means of the conventional doctor blade or calender rolls.

In forming the embossed pressure-sensitive tape 5, the strip 6 of synthetic elastomeric material is directed between an embossing roll 9 and a pressure roll 10, the embossing roll being formed on its surface with sharp ridges 11 to form the irregular depressions 8 in one surface 12 of the strip. It is essential that the opposite surface 13 of the strip 6 remains smooth and free of depressions or protuberances which would tend to cause adhesion of the adhesive 7 thereto when the tape is wound in rolls.

After the strip 6 passes between the embossing roll 9 and pressure roll 10, the surface 13 of the strip is caused to be somewhat roughened and is returned to its original smooth condition by means of a heated ironing roll 14 which is driven at a greater peripheral speed than the linear speed of the strip 6. By rotating the ironing roll 14 at a greater peripheral speed than the linear speed of the strip 6, the roll 14 acts to polish the surface 13 of the strip and to iron out any embossing marks which might appear thereon subsequent to the embossing operation.

Following the embossing and ironing operations, a suitable rubber, synthetic rubber or resin base pressure-sensitive adhesive is applied to the embossed surface 12 of the strip 6 by means of a conventional doctor blade or calender rolls indicated generally at 15. When the adhesive coating 7 is applied to the embossed strip 6, it will be noted that the irregular series of depressions 8 are filled with adhesive to provide footings 16 or points of anchorage for the adhesive coating.

The adhesive, together with the configuration of the embossing and the elastomeric qualities of the strip material, are intended to have dielectric qualities which do not create a periodicity effect in high frequency applications where the tape replaces the actual dielectric of cables spliced in the field in high frequency installations. As is well known in this art, ordinary tapes used in high frequency circuits create a discontinuity in the dielectric and, consequently, change the attenuation of the basic cable.

Embossed pressure-sensitive tape of the type shown and described herein is adapted to be formed into rolls without the usual separator layer of holland cloth, as the surface 13 of the strip 6 is ironed to eliminate any depressions or protuberances which may be formed thereon during the embossing operation.

While this invention has been shown in but one form, it is obvious to those skilled in the art that it is not so limited but is susceptible of various changes and modifications without departing from the spirit and scope of the claimed invention.

I claim as my invention:

1. The method of forming a polyethylene base friction tape and for anchoring pressure-sensitive adhesive thereto, which comprise impressing one surface of said base to provide it with a series of grooves to a limited depth, smoothing and polishing the opposed surface, and then applying pressure-sensitive adhesive to said grooved surface.

2. The method of forming a friction tape, which comprises indenting one surface of a strip of polyethylene to form therein a series of irregular transversely extending grooves, smoothing and polishing the opposed strip surface, and then applying a coating of pressure-sensitive adhesive to the grooved strip surface.

3. The method of forming a polyethylene base friction tape, which consists in impressing one surface of a strip of polyethylene to form it with a series of generally transversely extending grooves, smoothing and polishing the opposed strip surface in heated condition to render it free of protuberances and recesses, and then applying to said grooved surface and anchoring within its grooves, a coating of pressure-sensitive adhesive.

LOUIS M. GRIMES.

REFERENCES CITED

The following references are of record in the file of this patent:

UNITED STATES PATENTS

| Number | Name | Date |
|---|---|---|
| 238,181 | Struppe | Feb. 22, 1881 |
| 2,380,762 | Jackson | July 31, 1945 |
| 2,385,319 | Eustis | Sept. 18, 1945 |
| 2,395,419 | Mitchell | Feb. 26, 1946 |
| 2,462,977 | Kitchin et al. | Mar. 1, 1949 |
| 2,467,875 | Andrews | Apr. 19, 1949 |
| 2,502,841 | Henderson | Apr. 4, 1950 |